United States Patent
Banerjee et al.

(10) Patent No.: US 12,542,278 B2
(45) Date of Patent: Feb. 3, 2026

(54) SYNTHESIS OF A METASTABLE VANADIUM PENTOXIDE AS A CATHODE MATERIAL FOR ION BATTERIES

(71) Applicant: THE TEXAS A&M UNIVERSITY SYSTEM, College Station, TX (US)

(72) Inventors: Sarbajit Banerjee, College Station, TX (US); Justin L. Andrews, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 0 days.

(21) Appl. No.: 18/406,264

(22) Filed: Jan. 8, 2024

(65) Prior Publication Data
US 2024/0282947 A1 Aug. 22, 2024

Related U.S. Application Data

(63) Continuation of application No. 16/956,775, filed as application No. PCT/US2018/067381 on Dec. 21, 2018, now Pat. No. 11,870,067.

(60) Provisional application No. 62/609,225, filed on Dec. 21, 2017.

(51) Int. Cl.
| | |
|---|---|
| *H01M 4/485* | (2010.01) |
| *C01G 31/02* | (2006.01) |
| *C22B 15/00* | (2006.01) |
| *H01M 4/48* | (2010.01) |
| *H01M 4/62* | (2006.01) |
| *H01M 10/054* | (2010.01) |
| *H01M 4/02* | (2006.01) |

(52) U.S. Cl.
CPC ............ *H01M 4/485* (2013.01); *C01G 31/02* (2013.01); *C22B 15/0065* (2013.01); *H01M 4/483* (2013.01); *H01M 4/622* (2013.01); *H01M 4/625* (2013.01); *H01M 10/054* (2013.01); *C01P 2002/54* (2013.01); *C01P 2002/72* (2013.01); *C01P 2002/74* (2013.01); *C01P 2002/77* (2013.01); *C01P 2002/78* (2013.01); *C01P 2004/02* (2013.01); *C01P 2004/03* (2013.01); *C01P 2004/04* (2013.01); *C01P 2004/16* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| | | |
|---|---|---|
| 11,870,067 B2 | 1/2024 | Banerjee et al. |
| 2002/0014616 A1 | 2/2002 | Allcock et al. |
| 2003/0054258 A1* | 3/2003 | Ito .................... H01M 10/0568 429/339 |
| 2012/0164537 A1 | 6/2012 | Aoyagi et al. |
| 2013/0101848 A1* | 4/2013 | Banerjee ................ C09K 9/00 977/773 |
| 2016/0111720 A1 | 4/2016 | Arthur et al. |
| 2017/0207492 A1* | 7/2017 | Adams ................. H01M 4/622 |
| 2020/0321613 A1 | 10/2020 | Banerjee et al. |

FOREIGN PATENT DOCUMENTS

WO   WO 2019/126808   6/2019

OTHER PUBLICATIONS

Melghit et al. Soft chemistry synthesis of MxV2O5 + ε·nH2O (M=Co, Ni, Cu, Zn) nanowires. Materials Letters, 62, 3358-3360 (Year: 2008).*
Horrocks et al. Mitigating Cation Diffusion Limitations and Intercalation-Induced Framework Transitions in a 1D Tunnel-Structured Polymorph of V2O5. Chem Mater, 29, 10386-10397 (Year: 2017).*
Marley et al. Transformers: the changing phases of lowdimensional vanadium oxide bronzes. Chem Commun, 51, 5181 (Year: 2015).*
Tolhurst et al. Contrasting 1D tunnel-structured and 2D layered polymorphs of V2O5: relating crystal structure and bonding to band gaps and electronic structure. Phys Chem Chem Phys. 18(23): 15798-806 (Year: 2016).*
Semenenko et al. Flexible cathode materials based on V2O5 xerogels reinforced with electroactive Ba6Mn24O48 whiskers. Mendeleev Commun, 17, 5, 255-257 (Year: 2007).*
Horrocks, G. A. et al. "Mitigating Cation Diffusion Limitations and Intercalation-Induced Framework Transitions in a 1D Tunnel-Structured Polymorph of $V_2O_5$" *Chemistry of Materials*, 2017, pp. 10386-10397, vol. 29.
Marley, P. M. et al. "Emptying and filling a tunnel bronze" *Chemical Science*, 2015, pp. 1712-1718, vol. 6, Supporting Information pp. 1-9.
Patridge, C. J. et al. "Synthesis, Structural Characterization, and Electronic Structure of Single-Crystalline $Cu_xV_2O_5$ Nanowires" *Inorganic Chemistry*, 2009, pp. 3145-3152, vol. 48.

(Continued)

*Primary Examiner* — Tanisha Diggs
(74) *Attorney, Agent, or Firm* — SALIWANCHIK, LLOYD & EISENSCHENK

(57) ABSTRACT

A highly scalable process has been developed for stabilizing large quantities of the zeta-polymorph of $V_2O_5$, a metastable kinetically trapped phase, with high compositional and phase purity. The process utilizes a beta-$Cu_xV_2O_5$ precursor which is synthetized from solution using all-soluble precursors. The copper can be leached from this structure by a room temperature post-synthetic route to stabilize an empty tunnel framework entirely devoid of intercalating cations. The metastable ζ-$V_2O_5$ thus stabilized can be used as a monovalent-(Li, Na) or multivalent-(Mg, Ca, Al) ion battery cathode material.

12 Claims, 7 Drawing Sheets

(56) References Cited

OTHER PUBLICATIONS

Andrews, J. L. et al. "Reversible Mg-Ion Insertion in a Metastable One-Dimensional Polymorph of $V_2O_5$" *Chem*, Mar. 8, 2018, pp. 564-585, vol. 4, Supplemental Information, pp. 1-15.
Written Opinion in International Application No. PCT/US2018/067381, Apr. 12, 2019, pp. 1-5.
Jiao, L. et al. "Mg intercalation properties into open-ended vanadium oxide nanotubes" *Electrochemistry Communications*, available online Mar. 10, 2005, pp. 431-436, vol. 7.

\* cited by examiner

FIG. 3A
FIG. 3B
FIG. 3C
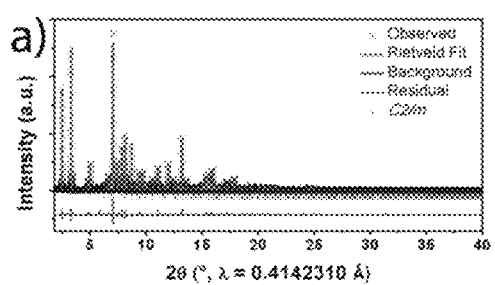
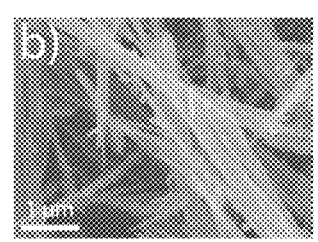
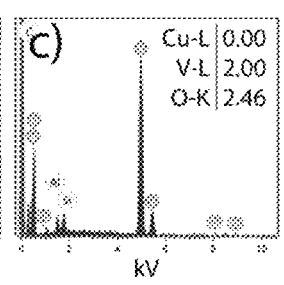
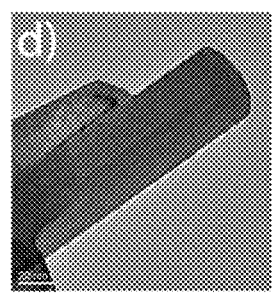
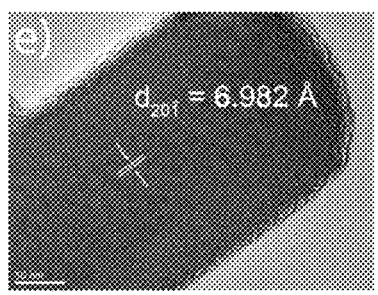
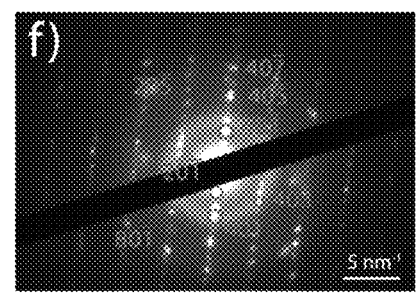
FIG. 3D
FIG. 3E
FIG. 3F FIG. 4A  FIG. 4B  FIG. 4C
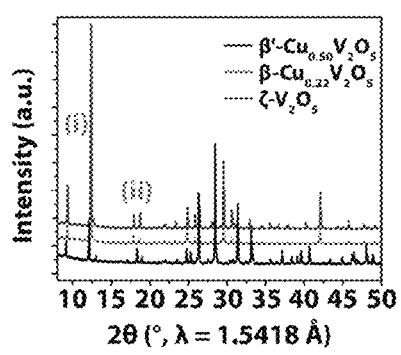
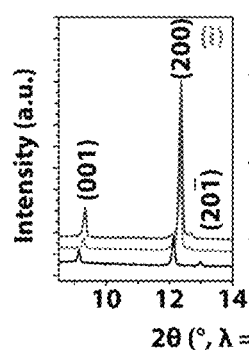
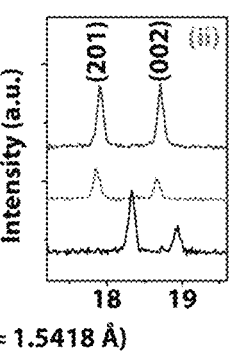
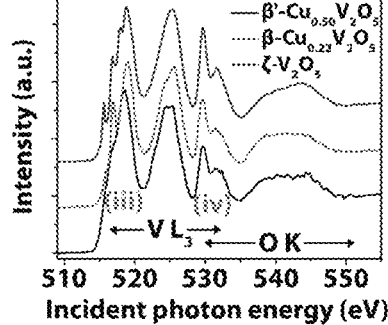
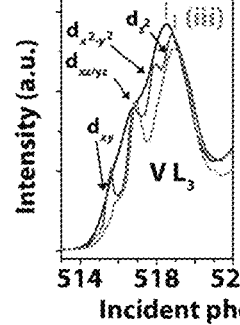
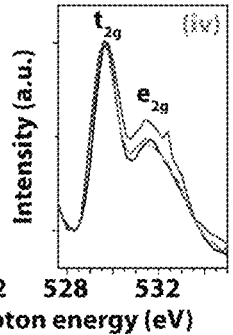
FIG. 4D  FIG. 4E  FIG. 4F

SYNTHESIS OF A METASTABLE VANADIUM PENTOXIDE AS A CATHODE MATERIAL FOR ION BATTERIES

CROSS-REFERENCE TO RELATED APPLICATIONS

This application is a continuation of U.S. application Ser. No. 16/956,775, filed Jun. 22, 2020, now U.S. Pat. No. 11,870,067, which is the U.S. National Stage Application of International Patent Application No. PCT/US2018/067381, filed on Dec. 21, 2018, which claims the benefit of U.S. Provisional Application No. 62/609,225, filed Dec. 21, 2017, which are incorporated herein in their entirety.

STATEMENT OF GOVERNMENT LICENSE RIGHTS

This invention was made with Government support under DMR 1504702 awarded by National Science Foundation, under 80NSSC17K0182 awarded by the National Aeronautical and Space Administration. The Government has certain rights in the invention.

BACKGROUND

The advent of the Li-ion battery has enabled portable technologies and driven the miniaturization of electronic devices. Most importantly, the rapid and widespread adoption of Li-ion batteries as the primary energy storage vector for mobile electronics and transportation have led to a number of insurmountable roadblocks, including the inability to use Li metal as the anode of the electrochemical cell due to serious safety concerns related to dendritic replating of lithium metal coupled with a low melting point, thus placing a hard ceiling on the energy storage metrics achievable at the anode. The use of Li is furthermore complicated by concerns over long-term Li availability, and the reliance of current cathodes on cobalt and nickel buoys the cost of the cells.[1-3] One proposed solution which addresses both issues (safety, sustainability) is the implementation of Mg-ion battery chemistry, which would potentially allow for the use of Mg metal as the anode, thereby immediately boosting energy storage metrics.[4] One problem encountered in the development of Mg-ion batteries has been the lack of suitable cathode materials capable of reversibly inserting $Mg^{2+}$ at high voltage and with high capacity.[4-6] Despite the fact that, axiomatically, the majority of all known materials are, in fact, metastable,[7] it is only recently that metastable materials and the intrinsic properties they imbue have been explored to solve solid-state diffusion problems in batteries.[7,8] Recently, the synthesis of a new, metastable polymorph of $V_2O_5$[9] has been reported and it has been further shown to exhibit superior voltage, capacity, and cyclability when compared to the thermodynamically stable $\alpha$-$V_2O_5$ for both Li and Mg.[10-12] This new phase, $\zeta$-$V_2O_5$, has an exceptional open circuit voltage of 3.3 V versus $Mg/Mg^{2+}$ and a reversible capacity of 93 mA h/g (after 100 cycles); however, the diffusion kinetics of the material, though vastly improved from the thermodynamically-stable $\alpha$-phase, are still impractically sluggish relative to Li-ion materials. The sluggish diffusion kinetics are due in part to the large size of the wires (150 nm along the 1D diffusion pathlength).[10] This represents a problem, which can immediately be addressed by nanostructuring. It has been shown that in $V_2O_5$ systems, size-effect-driven benefits are only realized when diffusion pathlengths are around 50 nm.[13] Furthermore, the synthesis of $\zeta$-$V_2O_5$, as reported previously, is deceptively difficult and not economically scalable.[9] Synthesis of the precursor requires the use of $AgCOOCH_3$, which is a notably expensive precursor salt to be used given that it is subsequently leached and removed as an AgCl impurity.[9,10] Leaching of Ag from within the structure furthermore requires careful calibration of pH to avoid dissolving the material in the acidic leaching medium entirely and purification requires costly wash steps to remove the sparingly soluble AgCl impurity produced as a result of leaching (100 ml 0.5 M $Na_2S_2O_3$ per 100 mg material), an important purification step because AgCl is electrochemically active within the desired voltage window.[9,10] Finally, several aspects of the material are further complicated by the presence of residual silver within the tunnels of the material (0.04-0.06 mol of Ag per mol of $V_2O_5$, as determined by ICP-MS).[9,10] Yet, despite the difficult synthesis and larger-than-desirable nanowire dimensions, the material exhibits extremely promising Mg-ion insertion behavior[10] and is one of such materials capable of reversible $Mg^{2+}$ insertion.[14-17] For this reason, additional synthetic routes, which allow for economically scalable synthesis of this material, and ideally those routes that result in smaller dimensions are of significant interest.

SUMMARY

An embodiment of the disclosure is a method of making $\zeta$-$V_2O_5$ nanowires comprising: hydrothermally reacting a vanadium (5+ or 4+) source and a copper source to provide $\beta/\beta'$-$Cu_xV_2O_5$ (0.33<x<0.66) nanowires; and reacting the $\beta/\beta'$-$Cu_xV_2O_5$ nanowires in solution containing a strong oxidizing agent under mild near-ambient conditions, thereby topochemically leaching Cu ions from the $\beta/\beta'$-$Cu_xV_2O_5$ nanowires to provide $\zeta$-$V_2O_5$ nanowires improved in several important ways with respect to previously reported synthetic approaches. In an embodiment, a molar ratio between the vanadium source and the copper source (V:Cu) is between 3:1 and 6:1. In an embodiment, the byproducts of the reaction are soluble and do not require a complexing agent to purify the $\zeta$-$V_2O_5$ product. In an embodiment, the method further comprises intercalating one or more ions selected from the group consisting of $Li^+$ ions, $Na^+$ ions, $Al^{3+}$ ions, $Y^{3+}$ ions, $Ca^{2+}$ ions, $Mg^{2+}$ ions, $Zn^{2+}$ ions, and combinations thereof.

An embodiment of the disclosure is a method of making magnesiated metastable $\zeta$-$V_2O_5$ nanowires comprising: topochemically inserting $Mg^{2+}$ ions into $\zeta$-$V_2O_5$ nanowires. In an embodiment, topochemically inserting Mg2+ ions into $\zeta$-$V_2O_5$ nanowires includes contacting the $\zeta$-$V_2O_5$ nanowires with an organic solution of alkyl-Mg. In an embodiment, the $\zeta$-$V_2O_5$ nanowires are contacted with a Mg-ion electrolyte and a voltage is applied thereby inserting $Mg^{2+}$ ions into the $\zeta$-$V_2O_5$ nanowires. In an embodiment, the Mg-ion electrolyte includes a solution of a Mg complex dissolved in a solvent. In an embodiment, the Mg-ion electrolyte includes a Mg complex dispersed within a conductive polymer. In an embodiment, the $\zeta$-$V_2O_5$ nanowires include metastable $\zeta$-$V_2O_5$ nanowires. In an embodiment, the magnesiated metastable $\zeta$-$V_2O_5$ nanowires have lattice constants comprising: a=15.25±0.4 Å, b=3.60±0.02 Å, and c=10.10±0.03 Å. In an embodiment, the magnesiated metastable $\zeta$-$V_2O_5$ nanowires have a unit cell angle, $\beta$, between about 109.1° and about 110.9°.

The present method produces a $\zeta$-$V_2O_5$ nanowire material which is distinct, crystallographically, from previously reported $\zeta$-$V_2O_5$ materials. The crystallographic differences dramatically improve the performance of the material and its application in monovalent and multivalent ion batteries. The method reported here results in a final $\zeta$-$V_2O_5$ product that is chemically distinct from the previously reported $\zeta$-$V_2O_5$. The previously reported material, made from the silver precursor, unavoidably retains some silver, as silver cannot be entirely leached from the structure due to its large size. The actual stoichiometry of the previously reported $\zeta$-$V_2O_5$ is $\zeta$-$Ag_{0.04}V_2O_5$. The stoichiometry obtained for the $\zeta$-$V_2O_5$ material using the copper precursor method reported here $\zeta$-$Cu_{0.0006}V_2O_5$. As a result of the greatly diminished residual stoichiometry (from 0.04 in the previous method to 0.0006 in the current method), the lattice parameters that define the unit cell of the material and determine its properties are meaningfully smaller. This not only proves it is a different material, but also means that the tunnels of the structure are more collapsed. This allows for the intercalation of more $Mg^{2+}$, allowing for larger energy densities and better batter performance.

The method is also significantly improved with respect to cost and simplicity. The previous method (using a silver precursor) is costlier. Silver is used exclusively as a templating agent i.e. it is used to template the structure, and is finally discarded as waste. Here, copper is used as a templating agent—a much less expensive templating agent. A second synthetic improvement is that the costly and wasteful $Na_2S_2O_3$ wash required to remove the AgCl impurity resulting from the previous method can be eliminated. Copper byproducts resulting from the current method are far more soluble, thus eliminating the need for washing. Finally, the current method is improved with respect to morphology and size control. The method reported here is "bottom-up" rather than "top-down." This means that the nanoparticles are grown from molecular precursors and the size of the materials can be constrained to grow smaller nanoparticles more easily. It is also more amenable to large-scale industrial flow-configurations.

The foregoing has outlined rather broadly the features of the present disclosure in order that the detailed description that follows may be better understood. Additional features and advantages of the disclosure will be described hereinafter, which form the subject of the claims.

DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which:

FIG. 1A: Previously utilized approach for preparing $\zeta$-$V_2O_5$. $AgCOOCH_3$ is reacted with bulk $V_2O_5$ particles hydrothermally wherein $Ag^+$ is intercalated into the structure, altering the structure from a layered structure to a tunnel structure. Subsequently, most of the $Ag^+$ is leached from within the structure using an acid medium, precipitating insoluble silver species, though some of the $Ag^+$ remains. FIG. 1B: A new, more cost-effective and improved method for producing a novel $\zeta$-$V_2O_5$ structure from soluble $Cu(NO_3)_2$ and $VO(C_5H_7O_2)$ precursors is shown. First, $\beta'$-$Cu_xV_2O_5$ nanoparticles are grown from solution in a novel process. Subsequently, Cu is leached from the structures in a room-temperature approach using a strong oxidizing agent ($Na_2S_2O_8$, $Br_2$, $I_2$, $NOBF_4$).

FIG. 2A: Laboratory diffraction pattern depicting patterns for $\beta'$-$Cu_xV_2O_5$ prepared by traditional solid state reaction and hydrothermal route. Scanning electron micrograph of a large bundle of $\beta'$-$Cu_xV_2O_5$ nanowires (FIG. 2B) and several nanowires with average widths of 45 nm (FIG. 2C). Transmission electron micrographs collected for several $\beta'$-$Cu_xV_2O_5$ nanowires (FIG. 2D) and a single nanowire with inset indexed selected area electron diffraction pattern (FIGS. 2E-2F).

FIGS. 3A-3F. Structural and morphological characterization of $\zeta$-$V_2O_5$ 3($a$) High-resolution synchrotron X-ray diffraction collected for fully-leached $\beta'$-$Cu_xV_2O_5$ (denoted $\zeta$-$V_2O_5$). Collected data is depicted as black crosses, background function is depicted in blue, Rietveld fit is depicted in red, and the residual (observed-Rietveld fit) is depicted in cyan (FIG. 3A). Observed reflections are marked by dark yellow tick marks. FIG. 3B: Scanning electron micrograph collected for leached $\zeta$-$V_2O_5$ with energy dispersive X-ray spectrum showing vanadium and oxygen signal with no discernible copper signal (FIG. 3C). Transmission electron micrograph of a leached nanowire with 44 nm width (FIG. 3D) with observed lattice fringes corresponding $d_{20-1}$ 6.982 Å (FIG. 3E). FIG. 3F: Selected area electron diffraction pattern for the wire depicted in FIGS. 3D and 3E.

FIGS. 4A-4C. Characterization of partially-leached $\beta'$-$Cu_xV_2O_5$. 4($a$) Laboratory X-ray diffraction patterns and expanded regions of the diffraction pattern (FIG. 4B), illustrating important changes in the patterns (FIG. 4C). X-ray absorption spectra collected for single nanowires of partially de-intercalated $\beta'$-$Cu_xV_2O_5$ (FIG. 4D). Expanded regions of the XAS pattern are shown in FIGS. 4E and 4F and highlight important changes in the spectra upon de-cupration, highlighting concomitant oxidation of the material on de-cupration.

FIG. 5A: SEM image of $\beta'$-$Cu_{0.22}V_2O_5$ nanowires. FIG. 5B: Energy-dispersive X-ray spectrum corresponding to the highlighted region in FIG. 5A shows a stoichiometry of $\beta'$-$Cu_{0.22}V_2O_5$.

FIG. 6A: Laboratory X-ray diffraction showing the monotonic decrease in lattice parameters as copper is leached from the tunnels with increasing amount of oxidant ($Na_2S_2O_8$, $Br_2$, $I_2$). Any aqueous or non-aqueous oxidizing agents can be utilized including but not limited to $Na_2S_2O_8$, $Br_2$, $I_2$ for aqueous and $NOBF_4$, $NO_2BF_4$ in acetonitrile for non-aqueous. FIG. 6B: Optical image of the materials corresponding to the powder diffraction patterns in FIG. 6A. With decreasing copper content, the powders turn monotonically from black to orange, indicating oxidation of the vanadium lattice and successful control over partial de-cupration.

FIGS. 7A and 7B show laboratory X-ray diffraction patterns.

DETAILED DESCRIPTION

Figure 1A:
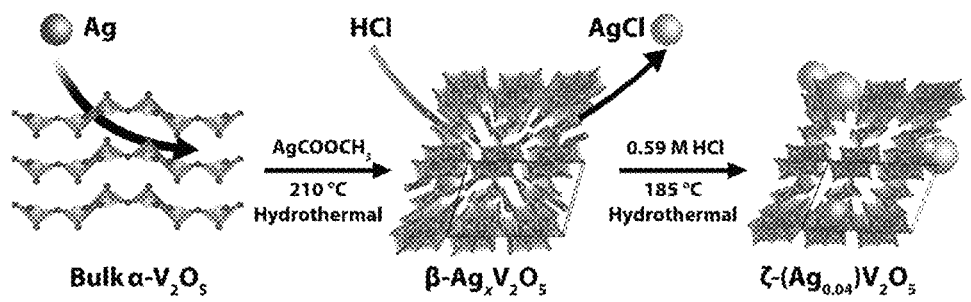
FIGS. 1A-1B. Comparison of synthetic schemes for preparing $\zeta$-$V_2O_5$ from $\beta'$-$Cu_xV_2O_5$.

The present disclosure provides $\zeta$-$V_2O_5$ nanowires that are compositionally and morphologically superior to previously-described $V_2O_5$ nanowires and provides synthesis methods for $\zeta$-$V_2O_5$ nanowires, which allow for more robust scaling of the synthesis of $\zeta$-$V_2O_5$.

Accordingly, in an aspect, the present disclosure provides a metastable ζ-$V_2O_5$ nanowire. As described further herein, such metastable ζ-$V_2O_5$ nanowires are configured to reversibly coordinate with one or more metal ions, such as one or more Mg ions. As also described further herein, such reversible coordination of metal ions by the metastable ζ-$V_2O_5$ nanowires of the present disclosure makes them suitable as, for example, cathode materials in ion batteries.

Accordingly, in an embodiment, the metastable ζ-$V_2O_5$ nanowires include one or more ions intercalated into and coordinated by interstices of the metastable ζ-$V_2O_5$ nanowire. In an embodiment, the one or more ions include one or more ions selected from the group consisting of $Li^+$ ions, $Na^+$ ions, $Al^{3+}$ ions, $Y^{3+}$ ions, $Ca^{2+}$ ions, $Mg^{2+}$ ions, and $Zn^{2+}$ ions, and combinations thereof.

In an embodiment, the one or more ions include one or more $Mg^{2+}$ ions. As described further herein, the metastable ζ-$V_2O_5$ nanowires of the present disclosure are useful in reversibly coordinating with one or more $Mg^{2+}$ ions and may coordinate with $Mg^{2+}$ ions over a broad range of stoichiometries. Accordingly, in an embodiment, the metastable ζ-$V_2O_5$ nanowire has a formula of $Mg_xV_2O_5$, wherein x is between about 0.01 and about 0.85.

As discussed further herein, such metal ions may be reversibly inserted into and extracted from the metastable ζ-$V_2O_5$ nanowire many times. For example, in an embodiment, metal ions may be reversibly inserted into and extracted from the metastable ζ-$V_2O_5$ nanowire 10 times, 20 times, 50 times, 100 times, 200 times, or more without significantly affecting the structure of the metastable ζ-$V_2O_5$ nanowire and, accordingly, its ability to further accept and coordinate metal ions into its interstices. As discussed further herein with respect to batteries of the present disclosure, such reversible insertion and extraction leads to high ion discharge capacities.

The metastable ζ-$V_2O_5$ nanowires of the present disclosure have a structure suitable for reversible ion insertion. In that regard, in an embodiment, the metastable ζ-$V_2O_5$ nanowires described herein include a metastable ζ-$V_2O_5$ nanowire having lattice constants comprising: a=15.25±0.4 Å, b=3.60±0.02 Å, and c=10.10±0.03 Å. In an embodiment, the metastable ζ-$V_2O_5$ nanowire has a unit cell volume, V, between about 515 Å2 and about 540 Å2. As discussed further herein, such lattice parameters and unit cell volume are indicative of a metastable ζ-$V_2O_5$ nanowire that has far fewer ions derived from a precursor material permanently intercalated into and coordinated into the interstices of the metastable ζ-$V_2O_5$ nanowire. In this regard, the metastable ζ-$V_2O_5$ nanowire of the present disclosure is able to reversibly accept more metal ions than previous $V_2O_5$ materials, thus leading to higher ion discharge capacities.

In an embodiment, the interstices of the metastable ζ-$V_2O_5$ nanowire include one or more quasi-one-dimensional tunnels configured to reversibly accept the one or more metal ions. In an embodiment, the one or more quasi-one-dimensional tunnels extend parallel to a major axis of the metastable ζ-$V_2O_5$ nanowire. In an embodiment, the metastable ζ-$V_2O_5$ nanowire has a unit cell angle, β, between about 108° and about 111°. In an embodiment, the unit cell angle, β, is the angle between the a and c axes of the metastable ζ-$V_2O_5$ nanowire.

The ζ-$V_2O_5$ nanowires described herein are compositionally superior to previously-described ζ-$V_2O_5$ nanowires in that they have truly "empty" quasi-one-dimensional tunnels. Previously-described methods of making $V_2O_5$ nanowires leave a residual of 0.04 equivalents of silver ($Ag^+$) per $V_2O_5$ within the tunnels. In an embodiment, the residual of equivalents is 0.04-0.06. The current method can be performed to result in truly empty ζ-$V_2O_5$ nanowires having very if any precursor metal, such as Cu, left in the quasi-one-dimensional tunnels of the ζ-$V_2O_5$. The quasi-one-dimensional tunnels of the ζ-$V_2O_5$ nanowires are further collapsed, thereby allowing for more $Mg^{2+}$ ion-capacity as compared to ζ-$V_2O_5$ nanowires prepared by previous methods. In this regard, the ζ-$V_2O_5$ nanowires of the present disclosure have improved overall specific energy density (~3% immediate improvement due to the removal of residual silver). In an embodiment, the ζ-$V_2O_5$ nanowires of the present disclosure include some residual precursor metal ions intercalated into the quasi-one-dimensional tunnels of the ζ-$V_2O_5$ nanowires and have a formula ζ-$(Cu_x)V_2O_5$, wherein x is between about 0.006 and 0.33. In an embodiment, the formula is β/β'-$(Cu_x)V_2O_5$ In an embodiment, x is between 0.006 and 0.66. In an embodiment, the metastable ζ-$V_2O_5$ nanowire has a smallest dimension between about 20 nm and about 80 nm. As discussed further herein, smaller nanowire dimensions generally lead to faster metal ion insertion and extraction kinetics. Accordingly, such metastable ζ-$V_2O_5$ nanowires having relatively narrow dimensions are configured to have fast metal ion insertion and extraction kinetics.

In another aspect, the present disclosure provides a battery comprising a cathode comprising the metastable ζ-$V_2O_5$ nanowires disclosed herein. In an embodiment, the cathode further comprises a conductive agent and a polymeric binder.

In an embodiment, the battery further comprises an electrolyte solution or suspension comprising a metal ion. Such an electrolyte solution or suspension is configured to contact the cathode and serve as a metal ion source for the cathode. In this regard, the battery is configured to reversibly cycle the insertion and extraction of metal ions to and from the cathode of the present disclosure. In an embodiment, the electrolyte solution comprises an organic solvent and a Mg-containing solute. In an embodiment, the Mg-containing solute includes an alkyl-Mg solute, wherein the alkyl-Mg solute includes substituted, unsubstituted, branched, and straight-chain alkyl moieties. In an embodiment, the alkyl moiety includes fluorinated alkyl moieties. In an embodiment, the electrolyte solution is an aqueous dispersion of metal nanoparticles.

In an embodiment, the battery further comprises an anode. In an embodiment, the anode has an anode material selected from the group consisting of activated carbon cloth, Mg metal, a Mg alloy containing Mg, and an intermetallic compound containing Mg.

In another aspect, the present disclosure provides a method of making ζ-$V_2O_5$ nanowires. In an embodiment, the method includes hydrothermally reacting a vanadium source and a copper source to provide β/β'-$Cu_xV_2O_5$ nanowires (0.33<x<0.66); and reacting the β-$Cu_xV_2O_5$ nanowires in a solution containing an oxidizing agent, such as $Na_2S_2O_8$, $Br_2$, $I_2$, or other suitable oxidizing agent, thereby topochemically leaching Cu ions from the β-$CuV_2O_5$ nanowires to provide ζ-$V_2O_5$ nanowires. In an embodiment, x=0.33-0.66.

In an embodiment, the vanadium source includes $V_2O_5$ and $VO(C_5H_7O_2)_2$. In an embodiment, the method includes the following reactions:

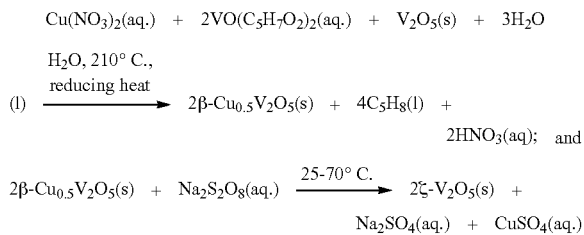

(1) $Cu(NO_3)_2(aq.) + 2VO(C_5H_7O_2)_2(aq.) + V_2O_5(s) + 3H_2O \xrightarrow{H_2O, 210°C, \text{reducing heat}} 2\beta\text{-}Cu_{0.5}V_2O_5(s) + 4C_5H_8(l) + 2HNO_3(aq.);$ and $2\beta\text{-}Cu_{0.5}V_2O_5(s) + Na_2S_2O_8(aq.) \xrightarrow{25\text{-}70°C} 2\zeta\text{-}V_2O_5(s) + Na_2SO_4(aq.) + CuSO_4(aq.)$ In an embodiment, the vanadium source includes $HVO_3$. In an embodiment, the method includes the following reactions:

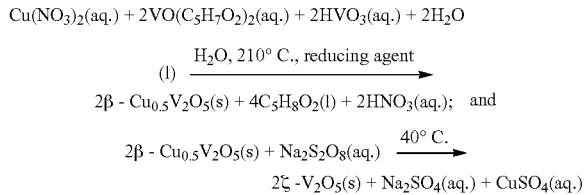

$Cu(NO_3)_2(aq.) + 2VO(C_5H_7O_2)_2(aq.) + 2HVO_3(aq.) + 2H_2O$ (1) $\xrightarrow{H_2O, 210°C, \text{reducing agent}}$ $2\beta\text{-}Cu_{0.5}V_2O_5(s) + 4C_5H_8O_2(l) + 2HNO_3(aq.);$ and $2\beta\text{-}Cu_{0.5}V_2O_5(s) + Na_2S_2O_8(aq.) \xrightarrow{40°C}$ $2\zeta\text{-}V_2O_5(s) + Na_2SO_4(aq.) + CuSO_4(aq.)$ In an embodiment, the copper source includes $CuSO_4$. In an embodiment, the reducing agent includes alcohols (2-propanol, ethanol, methanol) and ketones (acetone). In an embodiment, all reactants are water-soluble. Accordingly, reactions using such water-soluble reactions are scalable and robust and, for example, amenable to existing flow technologies.

In an embodiment, the $\beta CuV_2O_5$ nanowires made by the methods of the present disclosure have a formula $\beta Cu_xV_2O_5$, wherein x is between about 0.006 and 0.66 As discussed further herein, in this regard the nanowires of the present disclosure have very little residual Cu from the precursor materials and can reversibly accept metal ions, such as Mg ions, into the quasi-one-dimensional tunnels.

Further, the methods of the present disclosure leach Cu from the $\beta\text{-}Cu_xV_2O_5$ precursor nanowires using relatively mild conditions that do not include, for example, high pressure, high temperature, or low pH reaction conditions.

EXAMPLES

Example 1

Materials synthesis. Nanowires of $\beta'\text{-}Cu_xV_2O_5$ (0.33<x<0.66 were synthesized according to a facile hydrothermal synthesis which was modified from a previously reported synthesis of $F\text{-}Cu_{0.85}V_2O_5$ to obtain of $\beta'\text{-}Cu_xV_2O_5$.[24] $V_2O_5$, $Cu(NO_3)_2 \cdot 2.5H_2O$ and $VO(C_5H_7O_2)_2$ were added in a 1:1:2 ratio (300 mg total) to 16 ml of deionized water ($\rho$=18 MΩ/cm) and sonicated for 3 hours to solubilize the precursor materials. The reaction mixture was transferred to a 23 ml capacity polytetrafluoroethylene (PTFE)-lined stainless-steel autoclave (Parr) (13 mg/ml solid loading, 69.5% volume loading). The sealed autoclave was placed into an oven at 210° C. for 72 hours. After 72 hours, the autoclave was removed from heat and allowed to cool to room temperature radiatively. The resulting black powders were filtered and washed with copious amounts of deionized water and 2-propanol and were allowed to dry overnight. The copper was leached from within the tunnels using a room temperature aqueous oxidation reaction (Elbstype persulfate oxidation).[25] Stoichiometric amounts of $Na_2S_2O_8$ (0.25-5:1, $Na_2S_2O_8$:Cu) were added to 20 ml of deionized water ($\rho$=18 MΩ/cm) and gently stirred for 72 hours at a temperature ranging from 25-90° C. In an embodiment, any aqueous or non-aqueous oxidizing agents can be utilized including but not limited to $Na_2S_2O_8$, $Br_2$, $I_2$ for aqueous and $NOBF_4$, $NO_2BF_4$ in acetonitrile for non-aqueous. The resulting green (partially de-cuprated) to light-brown (fully de-cuprated) powders were washed with copious amounts of deionized water to remove traces of adsorbed sodium sulfate and copper sulfate (byproducts of the reaction as per Eq. 2). $\beta'\text{-}Cu_xV_2O_5$ bulk powders used in the study for comparison were synthesized according to traditional solid state conditions.[26] Cu and $V_2O_5$ powders were placed into a polyethylene cup and mixed in a Spex mill in a 0.55:1 ratio. The intimately mixed powders were then sealed in an evacuated quartz ampoule and allowed to react for two weeks at 550° C. The resulting polycrystalline powders were ground prior to laboratory X-ray diffraction measurements. Synthesis of the precursor material (Eq. 1) and subsequent de-cupration (Eq. 2) were optimized to multigram scale (~30 gram yield). In a typical reaction, X g of $Cu(NO_3)_2 \cdot 2.5H_2O$ were dissolved in 5 ml of water, X g of $VO(C_5H_7O_2)_2$ were sonicated in 700 ml of water for 48 hours to promote complete hydrolysis, and X g of $V_2O_5$ were added together to a 1000 ml glass-lined Parr autoclave and heated at 210° C. for 72 hours. The product was washed with copious amounts of deionized water and 2-propanol.

Example 2

Materials characterization. Laboratory powder X-ray diffraction data were collected in Bragg-Brentano geometry using a Bruker D8-Focus diffractometer (Cu K$\alpha$: $\lambda$=1.5418 Å; 40 kV voltage 25 mA current). Powders were lightly ground and packed into an aluminum sample holder with a Si(111) surface with an average depth of 0.7 mm S. High-resolution synchrotron X-ray diffraction was collected on a sample packed into in a poly(4,4'-oxydiphenylenepyromellitimide) capillary in transmission geometry at 295 K at beamline 11-BM of the Advanced Photon Source ($\lambda$=0.4133410 Å). Rietveld refinement of the high-resolution data was performed using the EXPGUI interface of GSAS software suite.[27] Details of the refinement and the resulting structure including bond distances and angles are found in Tables 1-3. Structures depicted in FIGS. 1A-1B were plotted using the VESTA software suite.[28] Scanning electron microscopy (SEM) images were collected using a JEOL JSM-7500F FE-SEM equipped with an Oxford energy-dispersive X-ray spectrometer (EDS), which was used to collect EDS spectra depicted in FIGS. 2A-2F, 5A-5B and 6A-6B. SEM images were collected at accelerating voltages between 3-5 kV; EDS spectra were collected at an accelerating voltage of 20 kV until a minimum of 450,000 counts was achieved. Prior to SEM characterization, samples were lightly ground in a mortar and pestle and affixed to an aluminum substrate with carbon tape and subsequently analyzed without any further manipulation. Transmission electron microscopy (TEM) images were collected using a JEOL JEM-2010 instrument at an accelerating voltage of 200 kV. Scanning transmission X-ray microscopy (STXM) measurements were collected at beamline 10-ID1 of the Canadian Light Source, a 2.9-GeV third-generation synchrotron facility. A 25-nm outermost-zone zone plate was used to obtain a diffraction-limited spatial resolution of, at all times, greater than 30 nm. A 500-line per mm plane grating monochromator was used to acquire the V L-edge and O K-edge spectral stacks. The incident photon flux ($I_0$) count rate was adjusted to be <20 MHz and was further optimized to 17.5 MHz as read by the STXM detector by adjusting the exit slits of the incident beam. The V L- and O K-edge stacks covered an energy range from 508-560 eV with energy steps of 0.2 eV in regions with spectral features of interest and 1 eV in the continuum region beyond the specific elemental edges with a uniform dwell time of 1 ms for each section. Transmission spectra were converted to absorption spectra using a background spectrum from the STXM maps, selected so as not to include sample signal. All STXM data were analyzed and processed using aXis2000 software (unicorn.mcmaster.ca/aXis2000.html).

Example 3

$\zeta$-$V_2O_5$ is a promising Mg-ion cathode material which is capable of reversibly inserting 0.33 $Mg^{2+}$ per $V_2O_5$ unit, equating to a capacity of 93 mA h g$^{-1}$ after 100 cycles. The diffusion kinetics of this material limit power density and the material's implementation within a battery. The fundamental chemical origins of the improved $Li^+$ and $Mg^{2+}$ capacity within this material resulting from the ability of the structure to mitigate self-trapping of polaronic states[10,12,29] has been elucidated. Disclosed herein are alternative modes of synthesis for nano-structuring this material to shorten diffusion pathlengths. This alternative approach to synthesizing $\zeta$-$V_2O_5$ is summarized in FIGS. 1A-1B and directly compared to the previously reported synthetic method.[9,10] Previously, $\zeta$-$V_2O_5$ was synthesized according to the following reaction (FIG. 1A):

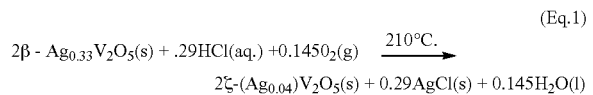

Figure 1B:
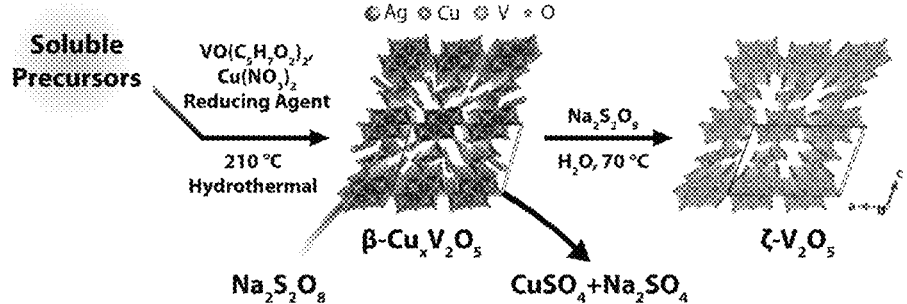
Figures 2A, 2B, 2C, 2D, 2E, 2F:
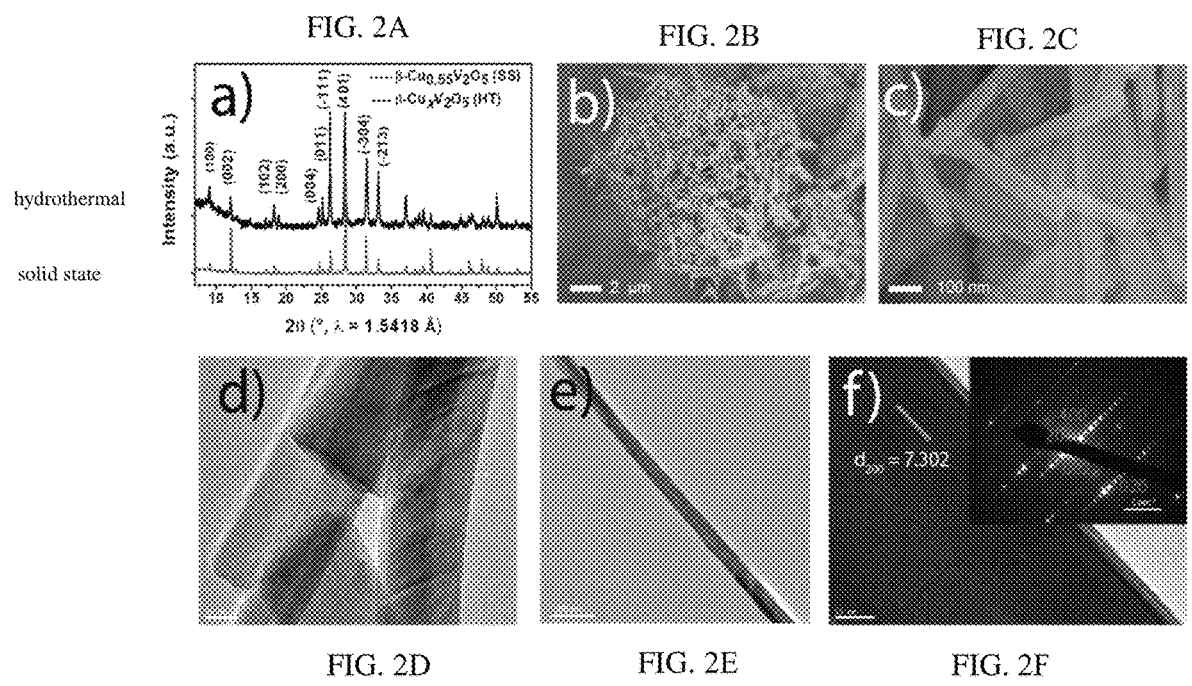
FIGS. 2A-2F. Structural and morphological characterization of $\beta'$-$Cu_xV_2O_5$.
Figure 5A:
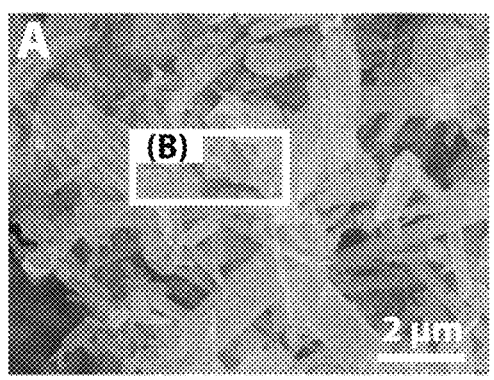
FIGS. 5A-5B. Energy dispersive X-ray spectroscopy for $\beta'$-$Cu_{0.22}V_2O_5$.
Figure 5B:
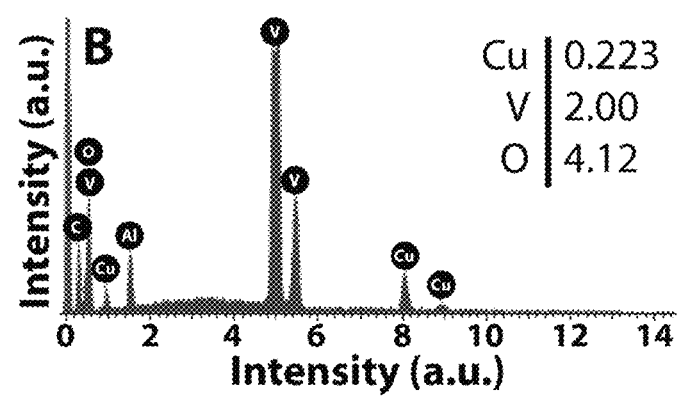
Figure 6A:
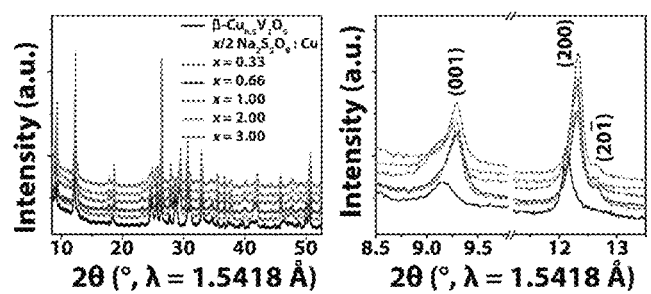
FIGS. 6A-6B. Characterization of partially de-cuprated structures.
Figure 6B:
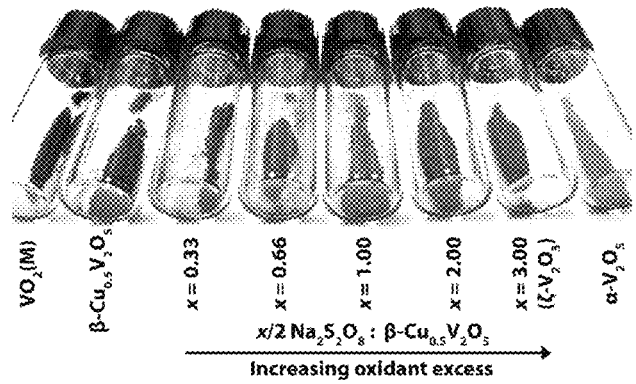

The synthetic method in Eq. (1) has several limitations. First, it includes the use of a highly-acidic reaction medium during leaching. The reaction is sensitive to variations in autoclave liner volume (due to repeated use of polytetrafluoroethylene liners), pH, temperature, and reaction duration. Small changes in these experimental parameters can result either in incomplete leaching of the $Ag^+$ from within the tunnels (leading to compositions of $\zeta$-$Ag_xV_2O_5$ where x>0.04) or alternatively in complete dissolution of the $V_2O_5$ framework. A drawback of the method shown in FIG. 1A is that synthesis according to Eq. 1 results in the formation of an insoluble AgCl product which is active in the relevant electrochemical windows (i.e. versus Li/$Li^+$, Mg/$Mg^{2+}$) and furthermore adds weight to the cathode material ($\zeta$-$Ag_{0.04}V_2O_5$ versus a more ideal $\zeta$-$V_2O_5$), decreasing the specific energy density of the material (3% added weight due to residual $Ag^+$ within the material). It has been reported that a washing step which effectively removes the AgCl impurity[10] uses copious volumes of concentrated sodium thiosulfate solutions to complex the AgCl by forming the highly soluble $Na_3[Ag(S_2O_3)_2]$. Furthermore, because the reaction method is top-down in the sense that the $\beta$-$Ag_xV_2O_5$ precursor (Eq. 1) is obtained by reacting solid, bulk $\alpha$-$V_2O_5$ particles[9] with silver acetate, the size of the resulting particles is quite large (~150 nm).[9,10] The larger particle size likely derives from the larger size of the precursor particles, where the microbeams are peeled from the larger particles as has been observed in the hydrothermal synthesis of other vanadium oxide nanoparticles.[30] In the past, we have shown that the size of the vanadium oxide particles dramatically impacts the phase homogeneity as well as the diffusion kinetics during lithiation and magnesiation.[12,13,31]

Herein disclosed is a bottom-up reaction method that results in much smaller $\beta$'-$Cu_xV_2O_5$ precursor morphology. The reaction, described in the methods section, and depicted schematically in FIG. 1B proceeds, for example, according to Eq. 2:

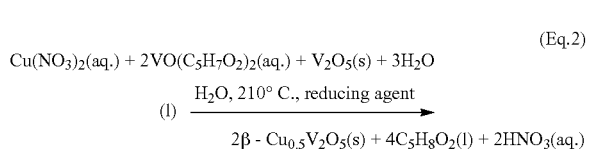

During the course of the reaction, $Cu^{2+}$ is reduced by one equivalent of vanadyl acetylacetonate ($V^{4+}$), which gives a mixed $V^{4+}/V^{5+}$ oxidation state of the vanadium in solution [Cu:$V^{4+}$:$V^{5+}$=1:1:1]. The addition of extra $V_2O_5$, which distinguishes this reaction from a previously reported method,[24] provides an additional source of $V^{5+}$ in solution, promoting the formation of the one-dimensional Wadsley bronze over layered $\varepsilon$-$Cu_{0.95}V_2O_5$ phase which forms with higher copper content.[19,32] X-ray diffraction collected for $\beta$'-$Cu_xV_2O_5$ synthesized hydrothermally is displayed in FIGS. 2A-2F where it is compared to the same material synthesized by a traditional solid state route. The difference in preferred orientation of the crystallites is readily apparent when viewing the powder X-ray diffraction patterns, where the prominence of the (401) reflection in readily apparent in the solid state material, but noticeably diminished in the hydrothermally synthesized sample, indicating growth parallel to the {010} family of planes. The nanowires have average widths of 45 nm (FIGS. 2B, 2C), a nearly 3-fold reduction in width of the wires synthesized by the method reported previously. Transmission electron microscopy images (FIGS. 2D-2F) show single-crystalline wires which index (SAED, inset to FIG. 2F) to the $\beta$'-$Cu_xV_2O_5$ phase. The use of $\beta$'-$Cu_xV_2O_5$ as a precursor in the subsequent leaching reaction is furthermore advantageous, as it permits the use of an Elbs-type persulfate oxidation[25] at near room temperature (30° C., open-air), which we did not observe to effect leaching of $Ag^+$ from with the silver bronze precursor. The milder reaction conditions (compared to previous work[9]) make for a more robust synthetic approach and result in a more consistently phase-pure material with complete retention of the original morphology (compare FIGS. 2B and 3B):

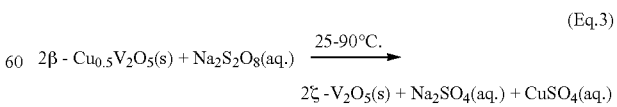

Moreover, all of the byproducts of the reaction are readily soluble in water (as evidenced by the blue-green supernatant, indicative of copper sulfate, that was decanted following the reaction in Eq. 3) and therefore easily removed, requiring no costly purification steps (compared to thiosulfate washes). Extensive characterization of the product obtained by the reaction according to Eq. 3 has been performed (FIGS. 3A-3F). First, high-resolution synchrotron diffraction on the obtained ζ-V$_2$O$_5$ powder (FIG. 3A) was performed, which retains its nanowire morphology and dimensions of ~45 nm (FIG. 3B) and Rietveld refinement of the High-resolution synchrotron X-ray diffraction data was subsequently performed in order to obtain a structure solution of the material. A high-resolution analysis allows both for confirmation of the structure as prepared by this method and allows and subtle structural differences to be uncovered. The Rietveld analysis confirms many similarities to the structure reported previously,[9,10] but reveals several crucial differentiating factors. First, the difficulty of removing all of the Ag from the tunnels using the previous precursor and synthetic method results in residual Ag contents between 0.04<x<0.06 within the tunnels of the material (as discussed above). It was previously reported that this small amount of Ag$^+$ played some role in stabilizing the material; however, in the structure reported here, there is no residual copper left within the 1D tunnels of the material, as determined by analysis of the residual electron density within the Patterson plots of the Rietveld Refinement (FIG. 3C) and by Energy Dispersive X-ray spectroscopy (EDS, FIGS. 5A-5B and FIGS. 6A-6B) which shows no Cu signal (which thus suggests that Cu content is below the detection limit of 0.1 wt % Cu, which, at most, would correspond to a stoichiometry of Cu$_{0.003}$V$_2$O$_5$). This is equivalent to an upper-bound 10-fold reduction in the residual metal content as compared to previous methodology.[9] The reduction in metal content within the structure has several implications. First, the absence of residual silver would likely be a boon to the electrochemical behavior of the material. In similar one-dimensional hexagonal Cs$_{0.35}$V$_2$O$_5$ bronzes,[33] the presence of the large Cs$^+$ within the tunnels is cited at the origin of the poor electrochemical behavior of the material during lithiation, as the sluggish diffusion of the large Cs$^+$ blocking diffusion channels within the material and irreversibly trapping Li$^+$ during cycling. Given the similarly large ionic radii of Ag$^+$ (1.3 Å versus 1.6 Å for Cs$^+$), it is likely that the residual Ag$^+$ blocks occupied tunnels within the structure. Secondly, it means that the ratio of V$^{4+}$/V$^{5+}$ is diminished (from V$^{4+}$/V$^{5+}$=1:32 to, at most, 1:666 in the case of the material resulting from Eq. 3). Thus, studies that aim to evaluate the fundamental behavior of ζ-V$_2$O$_5$ from a fundamental electronic structure perspective would benefit from this new synthesis, which produces a ζ-V$_2$O$_5$ product that is a more electronically pure material than that produced by the previous methodology. Thus, the synthetic product reported herein is much more desirable for fundamental studies evaluating the influence of inserted cations on the electronic structure of β-M$_x$V$_2$O$_5$ bronzes, in particular methods which are particularly sensitive to the dilute presence of Ag$^-$, which has a broad X-ray cross-section and is situated near the top of the valance band in ternary vanadium oxide bronzes.[34-36]

Another second difference between the structure elucidated in FIGS. 3A-3F as obtained from Rietveld refinement and that described in past work is the reduction in volume (Table 1) of the unit cell upon complete removal of the residual metal from the tunnels. Indeed, the reduction in volume is, consistent with further collapse of the tunnels without Ag$^+$ (or in this case Cu$^{2+}$) to prop them open. The structure refined by Rietveld analysis of the high-resolution synchrotron diffraction pattern (FIG. 2A, Tables 1-3) is depicted in the third step of the synthetic scheme in FIG. 1B, which is further corroborated by transmission electron microscopy (TEM). A nanowire of β'-Cu$_x$V$_2$O$_5$ with a diameter of 44 nm is depicted in FIGS. 3D and 3E, where lattice fringes corresponding to the d spacing of the (20-1) plane are observed running parallel to the growth direction of the nanowires. An indexed selected area electron diffraction pattern (SAED, FIG. 3F) further corroborates the structure solution obtained by Rietveld refinement and is consistent with previous characterization of the material grown by other synthetic methods.[18] Interestingly, the resolved lattice fringes of both the precursor material and the resulting empty ζ-V$_2$O$_5$ material (FIG. 2F and FIG. 3E, respectively) show that the wires grow parallel to the crystallographic b axis.

Thus, interestingly, despite the smaller nanowire dimensions achieved (both widths and lengths) as compared to previous synthetic methods, the material reported here has a different preferred orientation of nanowire growth. Indeed, despite microbeams which were on the order of 10-20 μm (in length) in previous reports,[10] Mg$^{2+}$ insertion was aided by diffusion pathlengths which were on the order of 150 nm (wire width) because the growth of the wires was perpendicular to the tunnel growth. In this work, the growth of the nanowires is parallel to the (20$\bar{1}$) planes and therefore the tunnels of the structure run along the length of the wires. Because this material has not been stabilized in the bulk, no studies concerning the impact of size (and thus diffusion pathlength) have been performed for this material, making this, only the second report of a synthetic method for ζ-V$_2$O$_5$, of great interest. Importantly, it has also been demonstrated that, similar to previous reports, the improved ζ-V$_2$O$_5$ reported here is also capable of reversibly intercalating Mg$^{2+}$ in the interstices, as evidenced in FIGS. 7A-7B.

Finally, because the material is leached near room temperature and has relatively slow reaction kinetics (72 hours for total de-cupration), partial de-cupration of the materials is possible (FIGS. 4A-4F). It has been shown in several materials that partially de-intercalating to form intermediate metastable phases is of interest, because the presence of the residual metal changes the electronic conductivity of the materials.[37] The occupancy of the d orbitals is of great importance because it impacts the degree to which polarons become trapped within the material (by thus increasing electrical conductivity).[11,29] However, partially de-intercalating the material fundamentally limits the number of active sites which can be occupied by the electrochemically active species such as Mg$^{2+}$. Thus, partial de-cupration may be a synthetic route to control electronic conductivity at the expense of capacity. Regardless, the ability to partially de-cuprate the materials provides yet another synthetic handle with which to tune the electronic properties of this material. Due to the interest in β'-Cu$_x$V$_2$O$_5$ as a metal-insulator material,[18,38] extending the phase diagram of the material (which traditionally is 0.31<x<0.66 by solid state high temperature synthesis)[19,26] is of great importance for evaluating the impact of copper content on the threshold of the metal-insulator transition. Partial de-cupration of the material was performed and the evolution of both its crystal structure and electronic structure was monitored as a function of de-cupration (FIGS. 4A-4F).

Figure 7A:
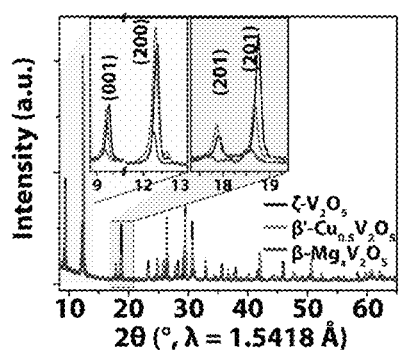
FIGS. 7A-7B. Characterization of Mg-intercalated $\zeta$-$V_2O_5$.
Figure 7B:
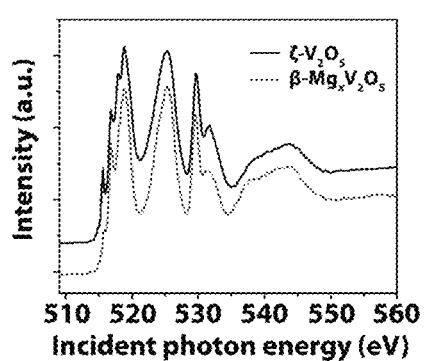

Samples were prepared by treating the β'-Cu$_x$V$_2$O$_5$ with stoichiometric amounts of Na$_2$S$_2$O$_8$ for varying times. The structural evolution of this material on successive de-cupration mirrors observations upon successive lithiation of the ζ-phase; namely, as the copper is removed from the structure, the tunnels begin to collapse (as noted by an increasing β angle between the a and c axes). A series of materials was prepared in this manner, as highlighted in FIG. 7A-7B, illustrating precise control over copper content within the material. Furthermore, the intensities of the (001) and (200) reflections increase in intensity with decreasing copper content, marking the removal of electron density from within the tunnels. Three of these same samples (where the fully de-intercalated phase is the same as depicted in FIGS. 3A-3F) were analyzed by scanning transmission X-ray microscopy in order to obtain X-ray absorption spectra at the V L- and O K-edges (508-560 eV). The electronic structure of vanadium oxide materials has been studied as they transition from $d^0$ to $d^1$ with successive $Li^+$ and $Mg^{2+}$ intercalation and concomitant reduction of the framework,[10,11,31,39] as well as evaluated fundamental electronic structure differences between $V_2O_5$ polymorphs.[21,22,40] In these studies, several features of interest at the $L_{III}$ feature of the vanadium L-edge were observed and in the region typically associated with V-O hybridized states (which depend heavily on the crystal field splitting of the V-O bonding within the polymorph). In particular, as the material is lithiated (increasing $d^1$ character), these first peaks at the $L_{III}$ ($d_{xy}$ character in $\alpha$-$V_2O_5$ and $d_{xy}/d_{yz}$ character in $\zeta$-$V_2O_5$) diminish in intensity (darken) due to Pauli blocking. Disclosed herein are observations of similar darkening of fine structure of interest in the X-ray absorption spectra with increasing copper content. In the case of the $\beta'$-$Cu_xV_2O_5$ (x~0.5) the fine structure often observed as sharp features at the $L_{III}$ onset are not visible due to Pauli blocking of the low-lying V 3d states at they are occupied by electrons donated to the lattice from the $Cu^+$ ions. Indeed the spectra observed here for $\beta'$-$Cu_xV_2O_5$ are similar to those observed for highly lithiated $\beta'$-$Li_xV_2O_5$ (x=0.66).[12] On partial de-cupration (stoichiometry determined to be $\beta$-$Cu_{0.22}V_2O_5$ by energy dispersive X-ray spectroscopy, FIGS. 5A-5B), the significantly overlapping $3d_{xy}$ and $3d_{yz}$ band states at the bottom of the conduction band are emptied of electron density and become visible at ~516 eV. The most peculiar finding, however, is the XAS signature observed for the fully de-cuprated structure of $\zeta$-$V_2O_5$, which differs significantly from that observed in previous studies,[10,29,41] although this is likely due to orientation effects. Previous studies indicate two distinct 3d states at the edge of the $L_{II}$; however in the case here (which is the more compositionally pure $\zeta$-$V_2O_5$ phase), the states appear to be significantly altered, with a very prominent peak at 516.5 eV, intermediate between the two-peak splitting of the orbitals described previously,[10] warranting further study of the electronic structure of this material.

$\beta'$-$Cu_{0.5}V_2O_5$ and $\zeta$-$V_2O_5$ have both been demonstrated to be of significant importance; the former is of interest for its electronic transitions which occur at a high temperature rivaling that of the metal-insulator transition in $VO_2$[18] and the latter is important for its metastability and use as an excellent Mg-ion cathode material, one of few in existence.[10] Both a novel synthesis of $\beta'$-$Cu_xV_2O_5$ nanowires as well as a topochemical route for conversion between the two phases which extends the phase diagram of $\beta'$-$Cu_{0.5}V_2O_5$ from 0.25<x<0.66 to 0.00<x<0.66 have been demonstrated, allowing for greater control over charge ordering within the material The synthetic method reported herein not only represents the most direct and facile synthesis for nanowires of $\beta'$-$Cu_{0.5}V_2O_5$ reported in the literature, but also allows for control over the morphology of the metastable $\zeta$-$V_2O_5$ product. Despite the shorter wire lengths and widths, the diffusion pathlength along the 1D tunnels extend along the length of the wires as opposed to the width of the wires. This is likely owed to the different growth mechanism. In the case of $\zeta$-$V_2O_5$ made from the 0-$Ag_xV_2O_5$ precursor, the wires likely form according to an intercalation and slip-condensation pathway, similar to the conversion between hydrated 6-$Ca_{0.25}V_2O_5 \cdot H_2O$ and $\beta$-$Ca_{0.25}V_2O_5$,[42] wherein the slip condensation which converts the two-dimensional bronze to the quasi-one-dimensional bronze occurs on the crystallographic axis perpendicular to the wire growth direction. The crystal growth mechanism for the approach reported here more likely nucleates and grows from solution (given the all-soluble precursors), growing along the length of tunnels, which likely represents the lowest-energy crystal face. One simple, but important observation is that, because $\zeta$-$V_2O_5$ cannot be synthesized directly, it must be stabilized from a ternary $\beta$-$M_xV_2O_5$ bronze. Furthermore, because the transformation between ternary bronze and empty polymorph is entirely topotactic, the morphology (FIGS. 2B, 3B) and orientation of crystal growth and thus 1D tunnels, is dependent on the properties of the selected precursor material. Therefore, syntheses which exhibit control over the precursor are beneficial in this regard. A second important point to make is that this difference in growth likely has serious implications for transport measurements. It has been shown in many instances in the literature that the $\beta$-$M_xV_2O_5$ bronzes exhibit one-dimensional transport along the length of the tunnels through phase-transformation-induced increased overlap of the d orbitals of the V2 sites (Table 1).[40,43-48] Indeed, it is specifically the degree of d orbital overlap (directly influenced by the V-V distance of the V2 sites along the tunnels) that induces metal-insulator transitions in several important work within these quasi-one-dimensional bronzes. Due to the complicated phase diagrams of ternary vanadium oxide bronzes (which are exceptionally sensitive to pH, pressure, temperature, and concentration), single crystals are difficult to grow. For this reason, many transport measurements reported in the literature for ternary vanadium oxide bronzes have been performed on sintered powders and polycrystalline samples.[49] It has been assumed that the nanowires measured have grown along the crystallographic axis parallel to the tunnels of the structure,[18,50-52] and thus current flow has been parallel to the direction of lowest resistance in these anisotropic crystal structures (with conduction along the one-dimensional V2 chains). The coexistence of two isostructural bronzes with perpendicular preferred orientations suggests that careful characterization of the preferred orientation before transport measurements, particularly in nanowires, is of great importance. In summary, a bottom-up synthesis for $\zeta$-$V_2O_5$ has been presented and is likely amenable to the use of morphology directing agents to cap growth along the relevant axes and will be the subject of future endeavors.

TABLE 1

Atom positions, fractional occupancies and thermal parameters obtained from refinement of the $\zeta$-$V_2O_5$ structure. Refinement statistics and lattice parameters are included in the table header.
a = 15.252532(28) Å, b = 3.602132(4) Å, c = 10.104168(13) Å, $\alpha$ = 90°, $\beta$ = 110.088(1)°, $\gamma$ = 90°; Volume = 521.369(1) Å³;
X2 = 3.063; Rwp = 13.11%; Rw = 9.99%

| Atom Label | x | y | z | Uiso*100 | Occupancy |
|---|---|---|---|---|---|
| V(1) | 0.11819(6) | 0.0000000(0) | 0.11818(8) | 0.59(2) | 1.000(0) |
| V(2) | 0.33890(6) | 0.0000000(0) | 0.10611(8) | 0.48(2) | 1.000(0) |
| V(3) | 0.29093(6) | 0.0000000(0) | 0.41429(8) | 0.57(2) | 1.000(0) |
| O(1) | 0.0000000(0) | 0.0000000(0) | 0.0000000(0) | 1.02(11) | 1.000(0) |

TABLE 1-continued

Atom positions, fractional occupancies and thermal parameters obtained from refinement of the ζ-V₂O₅ structure. Refinement statistics and lattice parameters are included in the table header.
a = 15.252532(28) Å, b = 3.602132(4) Å, c = 10.104168(13) Å,
α = 90°, β = 110.088(1)°, γ = 90°; Volume = 521.369(1) Å³;
X2 = 3.063; Rwp = 13.11%; Rw = 9.99%

| Atom Label | x | y | z | Uiso*100 | Occupancy |
|---|---|---|---|---|---|
| O(2) | 0.10988(22) | 0.0000000(0) | 0.26880(29) | 1.27(8) | 1.000(0) |
| O(3) | 0.13455(22) | 0.5000000(0) | 0.07796(27) | 0.30(7) | 1.000(0) |
| O(4) | 0.26599(19) | 0.0000000(0) | 0.22373(27) | 0.093(65) | 1.000(0) |
| O(5) | 0.43935(21) | 0.0000000(0) | 0.21844(31) | 1.22(8) | 1.000(0) |
| O(6) | 0.31618(20) | 0.5000000(0) | 0.05560(29) | 0.66(7) | 1.000(0) |
| O(7) | 0.39864(22) | 0.0000000(0) | 0.47903(33) | 1.62(8) | 1.000(0) |
| O(8) | 0.25733(20) | 0.5000000(0) | 0.42618(28) | 0.490(7) | 1.000(0) |

TABLE 2

Bond lengths for the refined ζ-V₂O₅ structure.

| | Vector | Bond Length |
|---|---|---|
| V1 octahedron | V(1)-O(1) | 1.7880(8) |
| | V(1)-O(2) | 1.5700(29) |
| | V(1)-O(3) | 1.8817(9) |
| | V(1)-O(3) | 1.8817(9) |
| | V(1)-O(4) | 2.1372(28) |
| | V(1)-O(6) | 2.3006(30) |
| V2 octahedron | V(2)-O(3) | 2.0349(28) |
| | V(2)-O(4) | 1.8859(27) |
| | V(2)-O(5) | 1.5624(30) |
| | V(2)-O(6) | 1.8716(8) |
| | V(2)-O(6) | 1.8716(8) |
| | V(2)-O(6) | 2.3685(29) |
| V3 square pyramid | V(3)-O(4) | 1.8301(26) |
| | V(3)-O(7) | 1.5455(32) |
| | V(3)-O(8) | 1.8876(9) |
| | V(3)-O(8) | 1.8876(9) |
| | V(3)-O(8) | 1.9888(29) |

TABLE 3

Bond lengths for the refined ζ-V₂O₅ structure.

| | Vector | Bond Length |
|---|---|---|
| V(1) octahedron | O(1)-V(1)-O(2) | 104.41(12) |
| | O(1)-V(1)-O(3) | 91.94(9) |
| | O(2)-V(1)-O(3) | 105.68(8) |
| | O(2)-V(1)-O(3) | 105.68(8) |
| | O(2)-V(1)-O(4) | 86.49(14) |
| | O(3)-V(1)-O(3) | 146.33(17) |
| | O(3)-V(1)-O(4) | 84.98(9) |
| | O(3)-V(1)-O(4) | 84.98(9) |
| V(2) octahedron | O(3)-V(2)-O(4) | 157.15(13) |
| | O(3)-V(2)-O(5) | 102.16(15) |
| | O(3)-V(2)-O(6) | 80.04(9) |
| | O(3)-V(2)-O(6) | 80.04(9) |
| | O(4)-V(2)-O(5) | 100.69(14) |
| | O(4)-V(2)-O(6) | 94.46(9) |
| | O(4)-V(2)-O(6) | 94.46(9) |
| | O(5)-V(2)-O(6) | 103.99(9) |
| | O(5)-V(2)-O(6) | 103.99(9) |
| | O(6)-V(2)-O(6) | 148.43(17) |
| V(3) square pyramid | O(4)-V(3)-O(7) | 104.59(15) |
| | O(4)-V(3)-O(8) | 95.97(9) |
| | O(4)-V(3)-O(8) | 95.97(9) |
| | O(4)-V(3)-O(8) | 148.40(12) |
| | O(7)-V(3)-O(8) | 104.21(9) |
| | O(7)-V(3)-O(8) | 104.21(9) |

TABLE 3-continued

Bond lengths for the refined ζ-V₂O₅ structure.

| Vector | Bond Length |
|---|---|
| O(7)-V(3)-O(8) | 107.01(16) |
| O(8)-V(3)-O(8) | 145.16(18) |
| O(8)-V(3)-O(8) | 76.37(9) |
| O(8)-V(3)-O(8) | 76.37(9) |

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

REFERENCES (1) Etacheri, V.; Marom, R.; Elazari, R.; Salitra, G.; Aurbach, D. Challenges in the Development of Advanced Li-Ion Batteries: A Review. *Energy Environ. Sci.* 2011, 4, 3243-3262 DOI: 10.1039/c1ee01598b.

(2) Barbier, E. B. Protect the Deep Sea. *Nature* 2014, 505, 475-477.

(3) Kesler, S. E.; Gruber, P. W.; Medina, P. A.; Keoleian, G. A.; Everson, M. P.; Wallington, T. J. Global Lithium Resources: Relative Importance of Pegmatite, Brine and Other Deposits. *Ore Geol. Rev.* 2012, 48, 55-69 DOI: 10.1016/j.oregeorev.2012.05.006.

(4) Aurbach, D.; Suresh, G. S.; Levi, E.; Mitelman, A.; Mizrahi, O.; Chusid, O.; Brunelli, M. Progress in Rechargeable Magnesium Battery Technology. *Adv. Mater.* 2007, 19 (23), 4260-4267 DOI: 10.1002/adma.200701495.

(5) Yoo, H. D.; Shterenberg, I.; Gofer, Y.; Gershinsky, G.; Pour, N.; Aurbach, D. Mg Rechargeable Batteries: An on-Going Challenge. *Energy Environ. Sci.* 2013, 6 (8), 2265-2279 DOI: 10.1039/c3ee40871j.

(6) Shterenberg, I.; Salama, M.; Gofer, Y.; Levi, E.; Aurbach, D. The Challenge of Developing Rechargeable Magnesium Batteries. *MRS Bull.* 2014, 29, 453-460 DOI: 10.1557/mrs.2014.61.

(7) Sun, W.; Dacek, S. T.; Ong, S. P.; Hautier, G.; Jain, A.; Richards, W. D.; Gamst, A. C.; Persson, K. A.; Ceder, G. The Thermodynamic Scale of Inorganic Crystalline Metastability. *Sci. Adv.* 2016, 2 (11), e1600225 DOI: 10.1126/sciadv.1600225.

(8) Parija, A.; Liang, Y.; Andrews, J. L.; Jesus, L. R. De; Prendergast, D.; Banerjee, S. Topochemically de-Intercalated Phases of V₂O₅ as Cathode Materials for Multivalent Intercalation Batteries: A First-Principles Evaluation. *Chem. Mater.* 2016, 28 (16), 5611-5620 DOI: 10.1021/acs.chemmater.6b01006.

(9) Marley, P. M.; Abtew, T. A.; Farley, K. E.; Horrocks, G. A.; Dennis, R. V.; Zhang, P.; Banerjee, S. Emptying and Filling a Tunnel Bronze. *Chem. Sci.* 2015, 6 (3), 1712-1718 DOI: 10.1039/C4SC03748K.

(10) Andrews, J. L.; Mukherjee, A.; Yoo, H. D.; Parija, A.; Marley, P. M.; Prendergast, David, G.; Cabana, J.; Klie, R. F.; Banerjee, S. Reversible Mg-Ion Insertion in a Metastable One-Dimensional Polymorph of $V_2O_5$. *CHEM, Under Rev.* 2017, Under Revi.

(11) De Jesus, L. R.; Horrocks, G. A.; Liang, Y.; Parija, A.; Jaye, C.; Wangoh, L.; Wang, J.; Fischer, D. A.; Piper, L. F. J.; Prendergast, D.; Banerjee, S. Mapping Polaronic States and Lithiation Gradients in Individual $V_2O_5$ Nanowires. *Nat. Commun.* 2016, 7, 12022 DOI: 10.1038/ncomms12022.

(12) Horrocks, G. A.; Parija, A.; De Jesus, L. R.; Wangoh, L.; Sallis, S.; Luo, Y.; Andrews, J. L.; Jude, J.; Fischer, D. A.; Prendergast, D.; Piper, L. F. J.; Banerjee, S. Mitigating Cation Diffusion Limitations and Intercalation-Induced Framework Transitions in a 1D Tunnel-Structured Polymorph of $V_2O_5$. *Chem. Mater.* 2017, 29 DOI: 10.1021/acs.chemmater.7b03800.

(13) Horrocks, G. A.; Likely, M. F.; Velazquez, J. M.; Banerjee, S. Finite Size Effects on the Structural Progression Induced by Lithiation of $V_2O_5$: A Combined Diffraction and Raman Spectroscopy Study. *J. Mater. Chem. A* 2013, 1, 15265-15277 DOI: 10.1039/c3ta13690f.

(14) Kim, C.; Phillips, P. J.; Key, B.; Yi, T.; Nordlund, D.; Yu, Y. S.; Bayliss, R. D.; Han, S. D.; He, M.; Zhang, Z.; Burrell, A. K.; Klie, R. F.; Cabana, J. Direct Observation of Reversible Magnesium Ion Intercalation into a Spinel Oxide Host. *Adv. Mater.* 2015, 27 (22), 3377-3384 DOI: 10.1002/adma.201500083.

(15) Levi, E.; Gershinsky, G.; Aurbach, D.; Isnard, O. Crystallography of Chevrel Phases, $MMo_6T_8$ (M=Cd, Na, Mn, and Zn, T=S, Se) and Their Cation Mobility. *Inorg. Chem.* 2009, 48 (18), 8751-8758 DOI: 10.1021/ic900805g.

(16) Gershinsky, G.; Yoo, H. D.; Gofer, Y.; Aurbach, D. Electrochemical and Spectroscopic Analysis of $Mg^{2+}$ Intercalation into Thin Film Electrodes of Layered Oxides: $V_2O_5$ and $MoO_3$. *Langmuir* 2013, 29 (34), 10964-10972 DOI: 10.1021/la402391f.

(17) Sa, N.; Kinnibrugh, T. L.; Wang, H.; Sai Gautam, G.; Chapman, K. W.; Vaughey, J. T.; Key, B.; Fister, T. T.; Freeland, J. W.; Proffit, D. L.; Chupas, P. J.; Ceder, G.; Bareno, J. G.; Bloom, I. D.; Burrell, A. K. Structural Evolution of Reversible Mg Insertion into a Bilayer Structure of $V_2O_5 \cdot mH_2O$ Xerogel Material. *Chem. Mater.* 2016, 28 (9), 2962-2969 DOI: 10.1021/acs.chemmater.6b00026.

(18) Patridge, C. J.; Wu, T.-L.; Sambandamurthy, G.; Banerjee, S. Colossal above-Room-Temperature Metal-Insulator Switching of a Wadsley-Type Tunnel Bronze. *Chem. Commun.* 2011, 47 (15), 4484-4486 DOI: 10.1039/cOccO5709f.

(19) Casalot, A.; Lavaud, D.; Galy, J.; Hagenmuller, P. The Vanadium Oxibronzes of the Formula $CuxV2O5$: II. Mechanism of Conduction and the Degree of Oxidation of the Copper. *J. Solid State Chem.* 1970, 2, 544-548.

(20) Yamaura, J.; Yamauchi, T.; Ninomiya, E.; Sawa, H.; Isobe, M.; Yamada, H.; Ueda, Y. X-Ray Characterization for the Charge Ordering on B(β')-Vanadium Oxide Bronzes. *J. Magn. Magn. Mater.* 2004, 272-276 (I), 438-439 DOI: 10.1016/j.jmmm.2003.11.148.

(21) Parija, A.; Liang, Y.; Andrews, J. L.; De Jesus, L. R.; Prendergast, D.; Banerjee, S. Topochemically de-Intercalated Phases of $V_2O_5$ as Cathode Materials for Multivalent Intercalation Batteries: A First-Principles Evaluation. *Chem. Mater.* 2016, 28 (16), 5611-5620 DOI: 10.1021/acs.chemmater.6b01006.

(22) Parija, A.; Prendergast, D.; Banerjee, S. Evaluation of Multivalent Cation Insertion in Single- and Double-Layered Polymorphs of $V_2O_5$. *ACS Appl. Mater. Interfaces* 2017, 9 (28), 23756-23765 DOI: 10.1021/acsami.7b05556.

(23) Vadym V. Kulish; Manzhos, S. Comparison of Li, Na, Mg and Al-Ion Insertion in Vanadium Pentoxides and Vanadium Dioxides. *RSC Adv.* 2017, 7, 18643-18649 DOI: 10.1039/C7RA02474F.

(24) Hu, W.; Du, X.; Wu, Y.; Wang, L. Novel $\varepsilon\text{-}Cu_{0.95}V_2O_5$ Hollow Microspheres and $\alpha\text{-}CuV_2O_5$ Nanograins: Facile Synthesis and Application in Lithium-Ion Batteries. *J. Power Sources* 2013, 237, 112-118 DOI: 10.1016/j.jpowsour.2013.03.002.

(25) Sethna, S. The Elbs Persulfate Oxidation. *Chem. Rev.* 1951, 49, 91-101 DOI: 10.1021/cr60152a002.

(26) Galy, J.; Lavaud, D.; Casalot, A.; Hangenmuller, P. The Vanadium-Oxygen Bronzes of the Formula $Cu_xV_2O_5$: Crystal Structure of the Phases $Cu_xV_2O_5$-β and ε. *Journal of Solid State Chemistry.* 1970, pp 531-543.

(27) Toby, B. H. EXPGUI, a Graphical User Interface for GSAS. *J. Appl. Crystallogr.* 2001, 34 (2), 210-213 DOI: 10.1107/50021889801002242.

(28) Momma, K.; Izumi, F. VESTA 3 for Three-Dimensional Visualization of Crystal, Volumetric and Morphology Data. *J. Appl. Crystallogr.* 2011, 44 (6), 1272-1276 DOI: 10.1107/S0021889811038970.

(29) Tolhurst, T. M.; Leedahl, B.; Andrews, J. L.; Marley, P. M.; Banerjee, S.; Moewes, A. Contrasting 1D Tunnel-Structured and 2D Layered Polymorphs of $V_2O_5$: Relating Crystal Structure and Bonding to Band Gaps and Electronic Structure. *Phys. Chem. Chem. Phys.* 2016, 18 (23), 15798-15806 DOI: 10.1039/C6CP02096H.

(30) Livage, J. Hydrothermal Synthesis of Nanostructured Vanadium Oxides. *Materials (Basel).* 2010, 3 (8), 4175-4195 DOI: 10.3390/ma3084175.

(31) Jesus, L. R. De; Zhao, Y.; Horrocks, G. A.; Andrews, J. L.; Stein, P.; Xu, B.-X. B.; Banerjee, S. Lithiation across Interconnected $V_2O_5$ Nanoparticle Networks. *J. Mater. Chem. A* 2017, 5, 20141-20152 DOI: 10.1039/C7TA04892K.

(32) Galy, J. Vanadium Pentoxide and Vanadium Oxide Bronzes—Structural Chemistry of Single (S) and Double (D) Layer $M_xV_2O_5$ Phases. *J. Solid State Chem.* 1992, 100 (2), 229-245 DOI: 10.1016/0022-4596(92)90097-F.

(33) Grégoire, G.; Soudan, P.; Farcy, J.; Pereira-Ramos, J.-P.; Badot, J.-C.; Baffier, N. Electrochemical Lithium Insertion in the Hexagonal Cesium Vanadium Bronze Cs0.35V2O5. *J. Power Sources* 1999, 81-82, 612-615 DOI: 10.1016/S0378-7753(98)00229-8.

(34) Chen, B.; Laverock, J.; Newby, D.; Su, T.-Y.; Smith, K. E.; Wu, W.; Doerrer, L. H.; Quackenbush, N. F.; Sallis, S.; Piper, L. F. J.; Fischer, D. A.; Woicik, J. C. Electronic Structure of β-Na X V 2 O 5 (X≈0.33) Polycrystalline Films: Growth, Spectroscopy, and Theory. *J. Phys. Chem. C* 2014, 118 (2), 1081-1094 DOI: 10.1021/jp410277m.

(35) Wangoh, L.; Marley, P. M.; Quackenbush, N. F.; Sallis, S.; Fischer, D. A.; Woicik, J. C.; Banerjee, S.; Piper, L. F. J. Electron Lone Pair Distortion Facilitated Metal-Insulator Transition in $\beta\text{-}Pb_{0.33}V_2O_5$ Nanowires. *Appl. Phys. Lett.* 2014, 104 (18), 182108 DOI: 10.1063/1.4875747.

(36) Quackenbush, N. F.; Allen, J. P.; Scanlon, D. O.; Sallis, S.; Hewlett, J. A.; Nandur, A. S.; Chen, B.; Smith, K. E.; Weiland, C.; Fischer, D. A.; Woicik, J. C.; White, B. E.;

Watson, G. W.; Piper, L. F. J. Origin of the Bipolar Doping Behavior of SnO from X-Ray Spectroscopy and Density Functional Theory. *Chem. Mater.* 2013, 25 (15), 3114-3123 DOI: 10.1021/cm401343a.

(37) Patridge, C. J.; Wu, T. L.; Jaye, C.; Ravel, B.; Takeuchi, E. S.; Fischer, D. A.; Sambandamurthy, G.; Banerjee, S. Synthesis, Spectroscopic Characterization, and Observation of Massive Metal-Insulator Transitions in Nanowires of a Nonstoichiometric Vanadium Oxide Bronze. *Nano Lett.* 2010, 10 (7), 2448-2453 DOI: 10.1021/nl100642b.

(38) Nithya, R.; Chandra, S.; Reddy, G. L. N.; Sahu, H. K.; Sastry, V. S. Rietveld Refinement and Electron Density Distribution in CuxV2O5. *ArXiv* 1-9.

(39) Horrocks, G. A.; De Jesus, L. R.; Andrews, J. L.; Banerjee, S.; Jesus, L. R. De; Andrews, J. L.; Banerjee, S. X-Ray Spectroscopy and Imaging as Multiscale Probes of Intercalation Phenomena in Cathode Materials. *JOM* 2017, 69 (9), 1469-1477 DOI: 10.1007/s 11837-017-2398-3.

(40) Tolhurst, T. M.; Leedahl, B.; Andrews, J. L.; Marley, P. M.; Banerjee, S.; Moewes, A. Contrasting 1D Tunnel-Structured and 2D Layered Polymorphs of $V_2O_5$: Relating Crystal Structure and Bonding to Band Gaps and Electronic Structure. *Phys. Chem. Chem. Phys.* 2016, 18 (23), 15798-15806 DOI: 10.1039/C6CP02096H.

(41) Velazquez, J. M.; Jaye, C.; Fischer, D. a; Banerjee, S. Near Edge X-Ray Absorption Fine Structure Spectroscopy Studies of Single-Crystalline $V_2O_5$ Nanowire Arrays. *J. Phys. Chem. C* 2009, 113 (18), 7639-7645 DOI: 10.1021/jp900809y.

(42) Marley, P. M.; Banerjee, S. Reversible Interconversion of a Divalent Vanadium Bronze between δ and β Quasi-1D Structures. *Inorg. Chem.* 2012, 51 (9), 5264-5269 DOI: 10.1021/ic300191y.

(43) Wadsley, A. D. Crystal Chemistry of Non-Stoichiometric Pentavalent Vandadium Oxides: Crystal Structure of $Li_{1+x}V_3O_8$. *Acta Crystallogr.* 1957, 10 (4), 261-267 DOI: 10.1107/50365110X57000821.

(44) Goodenough, J. B. Covalency Criterion for Localized vs Collective Electrons in Oxides with the Perovskite Structure. *J. Appl. Phys.* 1966, 37 (3), 1415-1422 DOI: 10.1063/1.1708496.

(45) Goodenough, J. B. Coexistence of Localized and Itinerant D Electrons. *Mater. Res. Bull.* 1971, 6 (10), 967-976 DOI: 10.1016/0025-5408(71)90075-4.

(46) Goodenough, J. B. Anomalous Properties of the Vanadium Oxides. *Ann. Rev. Mater. Sci.* 1971, 1 (1), 101-138 DOI: doi:10.1146/annurev.ms.01.080171.000533.

(47) Galy, J.; Darriet, J.; Casalot, A.; Goodenough, J. B. Structure of the $M_xV_2O_5$-β and $M_xV_{2-y}T_yi?O_5$-β Phases. *J. Solid State Chem.* 1970, 1, 339-348.

(48) Goodenough, J. B.; Manthiram, A.; Wnetrzewski, B. Electrodes for Lithium Batteries. *J. Power Sources* 1993, 43-44 (1-3), 269-275 DOI: 10.1016/0378-7753(93)80124-8.

(49) Ganne, M.; Tournoux, M. On the Bronzes of Vanadium of the Formula TlxV2O5. *Comptes rendus Hebd. des seances l'academie des Sci. Ser. C, Sci. Chim.* 1971, 273 (16), 975-977.

(50) Marley, P. M.; Stabile, A. A.; Kwan, C. P.; Singh, S.; Zhang, P.; Sambandamurthy, G.; Banerjee, S. Charge Disproportionation and Voltage-Induced Metal-Insulator Transitions Evidenced in β-$Pb_xV_2O_5$ Nanowires. *Adv. Funct. Mater.* 2013, 23 (2), 153-160 DOI: 10.1002/adfm.201201513.

(51) Marley, P. M.; Singh, S.; Abtew, T. A.; Jaye, C.; Fischer, D. A.; Zhang, P.; Sambandamurthy, G.; Banerjee, S. Electronic Phase Transitions of δ-$Ag_xV_2O_5$ Nanowires: Interplay between Geometric and Electronic Structures. *J. Phys. Chem. C* 2014, 118 (36), 21235-21243 DOI: 10.1021/jp506238s.

(52) Marley, P. M.; Horrocks, G. A.; Pelcher, K. E.; Banerjee, S. Transformers: The Changing Phases of Low-Dimensional Vanadium Oxide Bronzes. *Chem. Commun.* 2015, 51 (25), 5181-5198 DOI: 10.1039/C4CC08673B.

The invention claimed is:

1. A battery comprising:
   an anode;
   an electrolyte;
   a cathode comprising:
      a conductive agent;
      a polymeric binder; and
      a plurality of wires or rods having the formula $\zeta$-$V_2O_5$, wherein $\zeta$-$V_2O_5$ is intercalated with one or more metal ions, wherein $\zeta$-$V_2O_5$ has a structure configured for reversible metal ion insertion, wherein the structure comprises one or more tunnels that are perpendicular to a length of one or more wires or rods of the plurality of wires or rods, and wherein the one or more tunnels are configured to be reversibly inserted with the one or more metal ions over at least 100 cycles of the battery.

2. The battery of claim 1, wherein the one or more tunnels are quasi-one-dimensional.

3. The battery of claim 1, wherein the one or more ions are selected from the group consisting of $Li^+$ ions, $Na^+$ ions, $Al^{3+}$ ions, $Y^{3+}$ ions, $Ca^{2+}$ ions, $Mg^{2+}$ ions, $Zn^{2+}$ ions, and combinations thereof.

4. The battery of claim 1, wherein the one or more metal ions comprise $Na^+$.

5. The battery of claim 1, wherein the $\zeta$-$V_2O_5$ is intercalated with Li ions.

6. The battery of claim 1, wherein the cathode has a reversible capacity of at least 93 mAh/g.

7. The battery of claim 1, wherein the one or more tunnels are configured to be reversibly inserted with the one or more metal ions over at least 200 cycles of the energy storage device.

8. The battery of claim 1, wherein the cathode comprises $\zeta$-$V_2O_5$ in powder form dispersed in the conductive agent and the polymeric binder.

9. The battery of claim 1, wherein the $\zeta$-$V_2O_5$ is metastable.

10. The battery of claim 1, wherein the $\zeta$-$V_2O_5$ comprises microbeams.

11. The battery of claim 10, wherein the microbeams are 10-20 microns in length.

12. The battery of claim 1, wherein the structure has lattice constants comprising: a=15.25±0.4 Å, b=3.60±0.02 Å, and c=10.10±0.03 Å.

* * * * *